United States Patent [19]
Williams

[11] Patent Number: 4,737,925
[45] Date of Patent: Apr. 12, 1988

[54] METHOD AND APPARATUS FOR MINIMIZING A MEMORY TABLE FOR USE WITH NONLINEAR MONOTONIC ARITHMETIC FUNCTIONS

[75] Inventor: Tim A. Williams, Austin, Tex.

[73] Assignee: Motorola, Inc., Schaumburg, Ill.

[21] Appl. No.: 805,661

[22] Filed: Dec. 6, 1985

[51] Int. Cl.$^4$ .................... G06F 7/556; G06F 7/50
[52] U.S. Cl. .................................. 364/768; 364/715
[58] Field of Search .................... 364/768, 715, 737

[56] References Cited

U.S. PATENT DOCUMENTS

| | | | |
|---|---|---|---|
| 4,531,124 | 7/1985 | Lassallette et al. | 343/5 DP |
| 4,682,302 | 7/1987 | Williams | 364/768 |

FOREIGN PATENT DOCUMENTS 55-72252  5/1980  Japan ................................. 364/768

OTHER PUBLICATIONS

Frey et al., "A Table Reduction Technique for Logarithmically Architected Digital Filters", IEEE Trans. Acoust., Speech, and Signal Proc., vol. ASSP-33, No. 3, Jun. 1985, pp. 718–719.

Kurokawa et al., "Error Analysis of Recursive Digital Filters Implemented with Logarithmic Number System", IEEE Trans. Acoust., Speech and Signal Proc., vol. ASSP-28, No. 6, Dec. 1980, pp. 706–714.

Taylor, "An Extented Precision Logarithmic Number System", IEEE Trans. on Acoustics, Speech and Signal Processing, vol. ASSP-31, No. 1, Feb. 1983, pp. 232–234.

Kingsbury et al., "Digital Filtering Using Logarithmic Arithmetic", Electronics Letters, vol. 7, No. 2, Jan. 28, 1971, pp. 56–58.

Lang et al., "Integrated-Circuit Logarithmic Arithmetic Units", IEEE Trans. on Comp., vol. C-34, No. 5, May 1985, pp. 475–483.

Brubaker et al., "Multiplication Using Logarithms Implemented with Read-Only Memory", IEEE Trans. on Comp., vol. C-24, No. 8, 8/1975, pp. 761–765.

Primary Examiner—Gary V. Harkcom
Assistant Examiner—Tan V. Mai
Attorney, Agent, or Firm—John A. Fisher; Jeffrey Van Myers; Robert L. King

[57] ABSTRACT

A method which reduces the memory required to store correction factors used in logarithmic addition and subtraction of logarithmic operands. The method is implemented by a circuit which adds a predetermined correction factor to the minimum value of two logarithmic input operands. Correction factors are quantized to single polarity values. Predetermined ranges of magnitude values of the correction factors are selected in which the minimum value of each range is represented by a bias level. As a result of the bias levels, stored representations for the addition and subtraction factors are made much smaller resulting in less memory which is required. An addition of a predetermined bias level to the minimum value is effected simultaneous to addressing a predetermined adjustment factor in the reduced memory. A second addition is required to provide an output which represents either an addition or subtraction of the signed operands.

10 Claims, 2 Drawing Sheets

METHOD AND APPARATUS FOR MINIMIZING A MEMORY TABLE FOR USE WITH NONLINEAR MONOTONIC ARITHMETIC FUNCTIONS

CROSS REFERENCE TO RELATED APPLICATIONS

1. Application Ser. No. 06/681,453, now U.S. Pat. No. 4,682,302 entitled "LOGARITHMIC ARITHMETIC LOGIC UNIT", filed by Tim A. Williams and assigned to the assignee hereof.

2. Application Ser. No. 06/681,454, entitled "A CIRCUIT FOR ADDING AND/OR SUBTRACTING NUMBERS IN LOGARITHMIC REPRESENTATION", filed by Tim A. Williams and assigned to the assignee hereof.

TECHNICAL FIELD

This invention relates generally to circuits which utilize a look-up memory table, and more particularly, to logarithmic arithmetic circuits which use memory tables containing logarithmic correction factors to perform addition and subtraction.

BACKGROUND ART

The logarithmic number system has well known distinct advantages over other number systems including a wide range of number representations in a short and easily representable format. Signal processors which must process many multiplication operations may realize significant speed and size advantages by using the logarithmic form of multiplication. A disadvantage of the logarithmic number system has previously been the difficulty associated with implementing addition operations. Due to the nonlinear nature of logarithmic addition and subtraction, logarithmic circuits have not been commonly used because addition and subtraction is difficult to implement.

A technique used to implement a logarithmic addition or subtraction is to add a predetermined correction factor to the operand having the minimum exponential value. The correction factors are typically stored in memory circuits such as ROMs or programmable logic arrays (PLAs). An obvious disadvantage with such an implementation is the large amount of memory required to store a sufficient number of correction factors to maintain usable signal to quantization error ratios while minimizing harmonic distortions. The amount of memory needed is directly proportional to the amount of precision required. Precision is affected by two factors. The first precision factor is associated with the total number of memory locations implemented. An increase in the number of locations in the memory tables increases the precision of the addition operations.

The second precision factor is associated with the number of bits used to represent each of the correction factors. Therefore, precision of a logarithmic adder is directly proportional to the size of the memory table. A technique to reduce the number of correction factors needed for storage in memory is proposed by M. L. Frey and F. J. Taylor in "A Table Reduction Technique for Logarithmically Architected Digital Filters" in the IEEE *Transactions on Acoustics, Speech, and Signal Processing*, Vol. ASSP-33, No. 3, June 1985, pages 718-719. Frey et al. group correction factors to minimize the number of memory locations and further propose an algorithm for determining endpoint values of the groups. A disadvantage of this technique is that an additional quantization error is associated with almost every calculation. A further disadvantage of the grouping technique taught by Frey et al. is the large number of bits required to represent the correction factors.

BRIEF DESCRIPTION OF THE INVENTION

Accordingly, an object of the present invention is to provide an improved method and apparatus for minimizing the size of a memory table for use with nonlinear monotonic arithmetic functions.

Another object of the present invention is to provide an improved apparatus for minimizing the size of a correction factor memory table for use in logarithmic calculations.

A further object of the present invention is to provide an improved apparatus for executing logarithmic addition and subtraction operations.

Yet another object of the present invention is to provide an improved method for minimizing the total number of locations in a memory table used for logarithmic calculations and reducing the number of bits per operand required to implement the calculations, while maintaining a predetermined amount of precision.

In carrying out the above and other objects of the present invention, there is provided, in one form, a circuit and method for providing a logarithmic sum or difference of two input operands in logarithmic notation. A logarithmic sum is calculated by adding or subtracting a minimum valued logarithmic representation of the operands to a correction factor. The correction factor value is determined by the magnitude of the difference between the logarithmic notations of the input operands. In a preferred form, the correction factor comprises a bias level value and an adjustment value. A logic circuit is provided for receiving the input operands and providing a first output which is the magnitude of the difference of said input operands, and providing an operator control signal at a second output in response to the signs of the operands. A third output of the logic circuit provides a signal indicating which of the input operands contains the minimum value. A bias level circuit is coupled to the logic circuit for providing a predetermined one of N bias levels, where N is an integer, in response to at least the first output of the logic circuit. A first adder is coupled to the bias level circuit for selectively receiving the minimum operand value and adding the minimum operand value to a predetermined one of N bias levels to provide a first intermediate operand. An addressable storage circuit is also coupled to the logic circuit for selectively providing a predetermined second intermediate operand in response to both the first and second outputs of the logic circuit. A second adder is coupled to both the first adder and the addressable storage circuit, for adding or subtracting the first and second intermediate operands to provide said logarithmic sum or difference in response to the operator control signal.

These and other objects, features and advantages will be more clearly understood from the following detailed description taken in conjunction with the accompanying drawings.

DETAILED DESCRIPTION OF THE INVENTION

Figure 1:
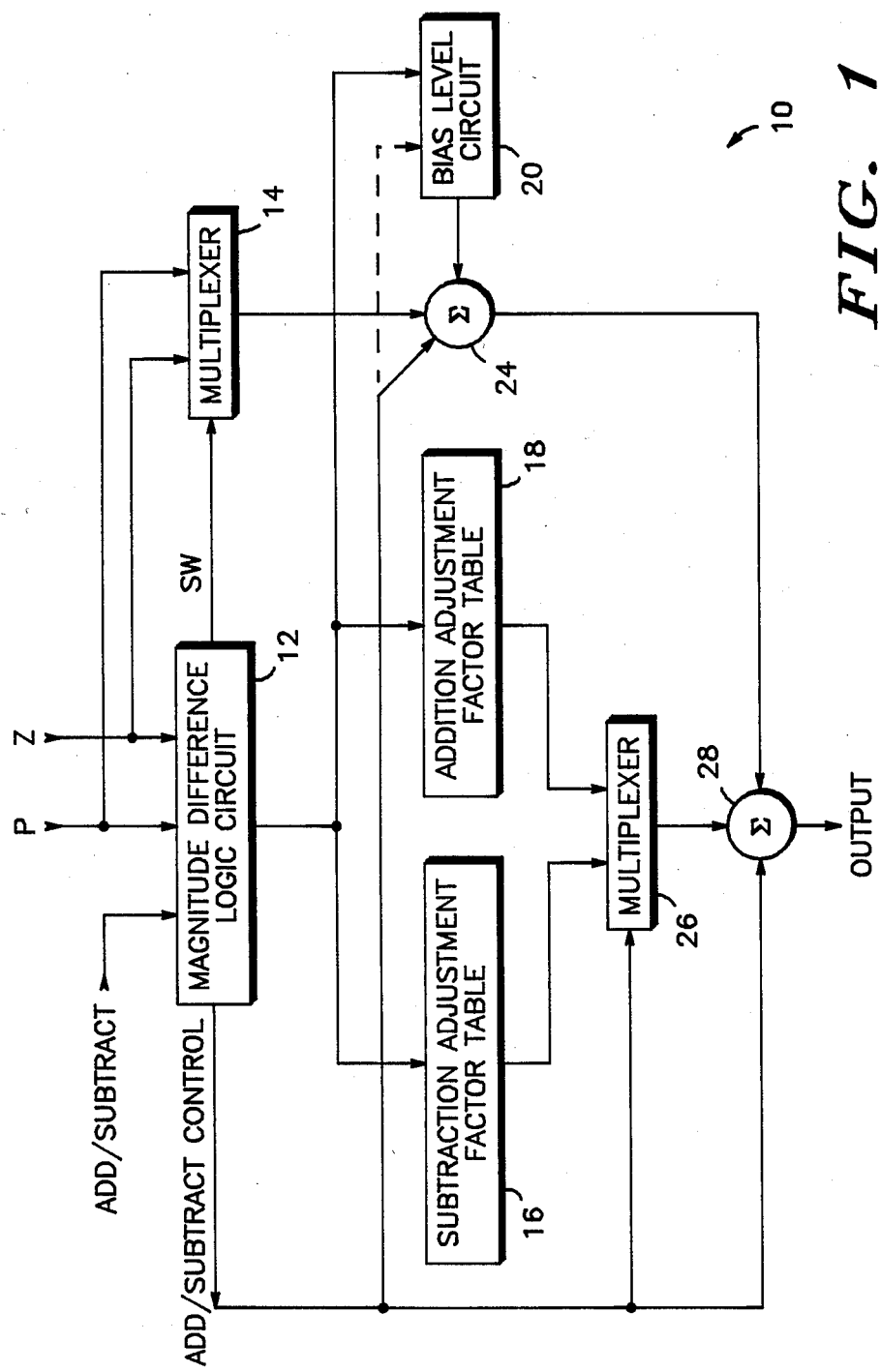
FIG. 1 illustrates in block diagram form a circuit for adding or subtracting numbers in logarithmic format with a size reduced adjustment factor memory table in accordance with the present invention.

Shown in FIG. 1 is a logarithmic processing unit 10 having a logic portion generally comprising a logic circuit 12 and a multiplexer 14. Logic circuit 12 has a first input for receiving a first input operand labeled "P" and a second input for receiving a second input operand labeled "Z". Operand P is also coupled to a first input of a multiplexer circuit 14, and operand Z is coupled to a second input of multiplexer circuit 14. Operands P and Z are in binary logarithmic representation having a sign bit, magnitude sign bit and a mantissa. The sign bit indicates whether the operand is greater or less than zero. The magnitude sign bit indicates whether the operand is greater or less than +1 and −1, respectively. A more detailed description of the sign bit and the magnitude sign bit may be found in my above-referenced U.S. Pat. No. 4,682,302. The operands are typically represented in two's complement form because addition and subtraction are easily performed in two's complement notation. A third input of logic circuit 12 receives a control input signal which controls whether an addition or a subtraction is to be effected by processing unit 10. A first control output of logic circuit 12 provides a control switch signal labeled "SW" which is connected to a control input of multiplexer 14. A second control output of logic circuit 12 provides an "add/subtract" operator control signal. A third output of logic circuit 12 is connected to an input of a subtraction adjustment factor memory table 16, to an input of an addition adjustment factor memory table 18 and to an input of a bias level circuit 20. Memory tables 16 and 18 and bias level circuit 20 may be implemented by a variety of conventional addressable memory circuits. A full adder circuit 24 has a first input connected to an output of multiplexer 14 and a second input connected to an output of bias level circuit 20. The "add/subtract" operator control signal of logic circuit 12 is connected to an arithmetic mode control input of adder 24 for selectively forcing a subtraction. An output of adjustment factor memory table 16 is connected to a first input of a multiplexer 26, and an output of adjustment factor memory table 18 is connected to a second input of multiplexer 26. An output of multiplexer 26 is connected to a first input of a full adder circuit 28. An output of adder 24 is connected to a second input of adder 28, and the "add/subtract" operator control signal is connected to both a control input of multiplexer 26 and an arithmetic mode control input of adder 28. An output of adder 28 provides a logarithmic sum which is either a sum or difference of operands P and Z.

Figure 2:
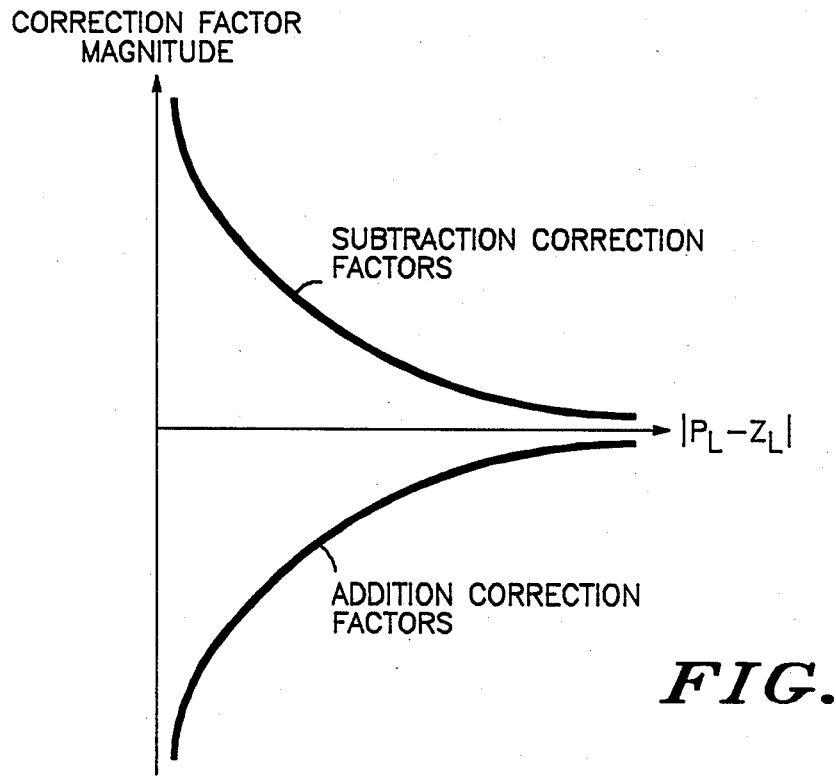
FIG. 2 illustrates in graphical form a relationship between correction factors for logarithmic addition and subtraction.

In operation, logarithmic processing unit 10 functions to provide an output which is the logarithmic sum or difference of input operands P and Z, wherein both operands are represented in the same base of a plurality of predetermined bases. Since logarithmic addition and subtraction are nonlinear, a logarithmic addition or subtraction is typically performed by adding a predetermined correction value to the smallest of the values of the operands. The predetermined correction factor is typically stored in a memory table and is a predetermined value which depends upon three factors. The three factors are the value of the logarithmic base, whether an addition or subtraction is being effected, and the magnitude of the differential between operands. A graphical illustration of the range of correction values which is required is shown in FIG. 2. Correction values utilized when an addition operation is being effected are negative in value, and correction values utilized for subtraction operations are positive. As illustrated, when the magnitude differential of the logarithmic values of the operands is small, the magnitude of the correction factor is large. As the magnitude differential increases, the correction factors become smaller. Accordingly, more memory storage is required to store the correction values associated with small magnitude differentials.

Figure 3:
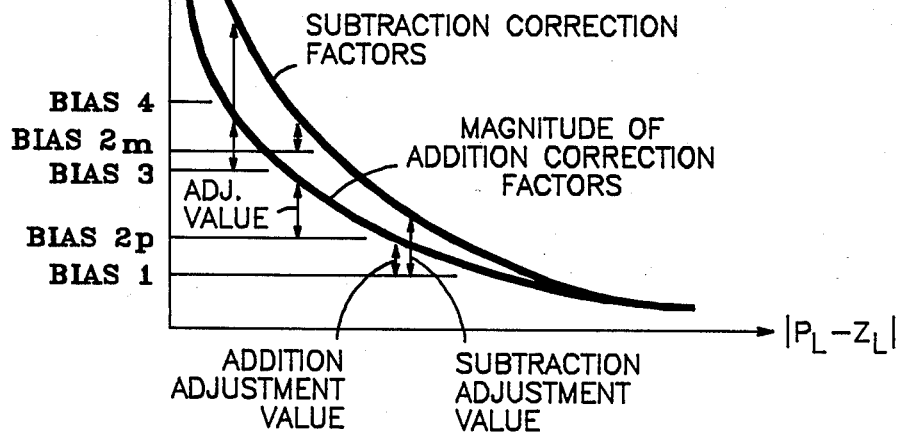
FIG. 3 illustrates in graphical form another relationship between correction factors for logarithmic addition and subtraction.

A substantial savings of correction factor memory table storage size may be realized by reducing the number of bits per location if the correction factor values for addition operations are quantized into positive values as shown in FIG. 3. It should be apparent that the present invention may also be implemented by quantizing the correction factor values for subtraction into negative values and following the remaining steps to reduce the table storage size. Further, it should be well understood that when a reduction in memory is discussed herein, a comparison is being made between the present invention and a conventional circuit providing correction factors of the same bit width and precision. When all correction factors are positive for the illustrated quantization of FIG. 3, no sign extension bits associated with negative numbers have to be stored for the addition correction factors. A further reduction in memory may be realized by quantizing the difference between the addition and subtraction values and representing the subtraction values as a predetermined addition value plus a corresponding delta value. This quantization is possible since the subtraction factors are all greater than or equal to the addition correction factors. Since the delta values are each relatively small valued compared to each subtraction value, a savings in memory of approximately fifty percent may be realized with this quantization without reducing precision. Although a substantial reduction in memory table size may be realized using this method, an adder for adding the delta factor and the corresponding addition value must be placed in a speed critical path to implement this method in hardware. Therefore, processor speed is sacrificed to minimize memory when using the delta values.

An alternative method which minimizes the size of memory and which is preferred over the previously described method of adding a delta correction value to a quantized correction value involves the use of a plurality of predetermined bias level signals. Each bias level is quanitized over a range of magnitude difference values and is added to an addressed adjustment factor so that the stored correction factors may be made smaller in value without sacrificing any precision. The location of the bias level values may be made in various ways. Regardless of the magnitude of each of the levels and the number of levels used, a reduction in memory storage size may be effected. A simple algorithm will be discussed below as being one of many methods to determine location and number of bias levels preferred.

In the illustrated form, logic circuit 12 of FIG. 1 functions to provide an absolute value of the difference between the exponential values of P and Z. This magnitude difference is coupled to adjustment factor tables 16 and 18 and to bias level circuit 20. The absolute value of the difference is used to address a predetermined correction factor in each of tables 16 and 18. The output of unit 10 is essentially the sum of the minimum logarithmic value of operands P and Z and a correction factor. The minimum logarithmic value is determined by logic circuit 12 and provided by multiplexer 14 in response to the switch signal. The correction factor is implemented as two components comprising the adjustment value provided by one of tables 16 and 18 and the bias level value provided by circuit 20. However, to efficiently implement the present invention, these two components of the correction value are not directly added to one another as described herein. The bias level is addressed by the absolute value difference signal of logic circuit 12 and coupled as an input operand to adder 24. It should be readily apparent that correction factor tables 16 and 18 and bias level circuit 20 may be implemented with conventional PLAs or other analogous memory circuitry. Similarly, the function of logic circuit 12 may be readily implemented with conventional circuitry. A further description of the operation of circuitry analogous to logic circuit 12 and correction factor tables 16 and 18 may be found in my previously mentioned U.S. Pat. No. 4,682,302. Multiplexer 14 is a conventional multiplexer circuit and receives both input operands P and Z. Multiplexer 14 provides the operand having the minimum logarithmic magnitude to the first input of adder 24 in response to the switch control signal. Logic circuit 12 readily determines which logarithmic operand is a minimum value. Adder 24 adds the minimum operand value provided by multiplexer 14 to a predetermined bias level in response to the add/subtract control signal provided by logic circuit 12. The add/subtract control signal functions to create either an addition or subtraction operation depending upon the signs of operands P and Z. The add/subtract control signal has several functions. The add/subtract control signal forces adders 24 and 28 to either perform an addition or a subtraction operation. The add/subtract control signal also functions to control multiplexer 26 and couple the correct adjustment factor from either table 16 or table 18 to adder 28.

Simultaneous to the addition of the minimum logarithmic value and bias level value by adder 24, predetermined adjustment factor values are addressed and outputted from each of tables 16 and 18 in a parallel operation. Tables 16 and 18 contain adjustment factors, each of which corresponds to an assigned operand magnitude difference value. Multiplexer 26 couples the correct arithmetic mode adjustment factor to adder 28 in response to the add/subtract control signal. Which adjustment factor is coupled to adder 28 depends upon whether or not the signs of operands P and Z result in an effective addition or subtraction operation and is controled by the add/subtract input signal. Adder 28 then adds the correction factor to the output sum of adder 24 to provide an output which represents the logarithmic sum or difference of signed input numbers P and Z. Adders 24 and 28 may be implemented as conventional full adders.

As illustrated, adjustment factor tables 16 and 18 may be made much smaller by storing small adjustment values than if full value correction factors for both addition and subtraction are stored therein. Use of a small adjustment value which is to be added to a bias level for each correction factor substantially reduces the size of memory required to implement tables 16 and 18. Further, the reduction in size of tables 16 and 18 is not made at the expense of adding an additional memory circuit in the form of bias level circuit 20. Bias level circuit 20 is a small memory which typically stores a few predetermined exact valued bias values of small bit size. The present invention encodes the subtraction and addition factors with two distinct components (i.e. a bias level value and an adjustment value) and one of the components, the bias level value, may be the same bias level for both factors. Therefore, the numbers stored in the subtraction adjustment factor tables will be larger than the numbers stored in the addition adjustment factor table. For large magnitude differentials, the difference in magnitude between addition and subtraction factors is not large. However, for smaller magnitude differentials, the difference in magnitude between addition and subtraction factors becomes more significant as can be seen in FIG. 3. Therefore more bias levels may be preferred to be provided for the range of small magnitude differentials than for the range of large magnitude differentials.

An additional feature of the present invention embodies the use of two distinct bias levels for the same logarithmic magnitude difference value. A first bias level corresponds to an addition value, and a second bias level corresponds to a subtraction value. For example, in FIG. 3 the bias level labeled "2" has been divided into two values. A first bias level, Bias 2p, is the bias level for a predetermined magnitude difference range when addition is being effected. However, if a subtraction is being effected, a second bias level, Bias 2m, is the proper bias level. To implement two bias levels per magnitude difference value, the add/subtract control line must also be coupled to bias level circuit 20 which will selectively output a predetermined addition or subtraction bias level in response to the add/subtract control signal. By using separate bias levels for addition and subtraction, further reduction in the size of the adjustment values is realized which translates into a reduction of required memory.

As an example of how to determine placement of the bias levels along the range of correction factor magnitudes, the following discussion is intended to illustrate only one of many possible techniques. Although a random positioning of bias levels along the range of correction factor magnitudes will result in substantial savings of memory, a more optimum choice of bias levels may be readily made. Initially, the number of bits per correction factor to be used in tables 16 and 18 should be chosen. A predetermined acceptable level of harmonic distortion or arithmetic precision determines the choice of the number of bits required per correction factor. Another measure of the error associated with the use of quantized correction values is the RMS error between calculations performed with a quantized logarithmic number system and a greater precision floating point number system. However, it should be understood that when comparing the present invention with previous circuits, the present invention maintains the same predetermined degree of precision while reducing memory size compared with previous circuits. Naturally, memory size is directly proportional to the number of bits implemented. The following is an illustrative technique of determining the bias levels. A beginning index of zero is chosen and a bias level of zero is chosen. The largest number which is representable by the number of bits chosen for the tables should be subtracted from the actual value of the subtraction correction factor at the current index. If the resulting number is non-negative, the current bias level should be set equal to the resulting number. If and when the resulting number becomes negative, all the bias levels have been calculated and the computation is ended. When the resulting number is non-negative, the current index should be set equal to the index of the last correction factor which has a value equal to the current bias level, plus one. Again, the largest number representable by the number of bits chosen for the tables is subtracted from the correction factor value of the subtraction correction factor at the current index. The above procedure is repeated until a negative number results from the subtraction. In this manner a predetermined number of bias levels are calculated to implement the present invention. It should however be apparent that the determination of where to locate the bias levels is peripheral to the present invention because the present invention offers a substantial savings in memory regardless of the bias level position.

By now it should be apparent that the present invention implements a method for reducing the size of memory required to implement a logarithmic addition processing unit. The present invention may be implemented by a circuit which does not reduce the speed of the processing compared to a circuit utilizing extra memory otherwise required to provide analogous circuit performance. In particular, during the time an adjustment factor is being addressed, a bias level is being added by adder 24 to the minimum logarithmic value provided by multiplexer 14. The addition performed by adder 28 is essentially not delayed by the operation of adder 24. By quantizing the addition factors of FIG. 2 to positive values, an initial substantial reduction in memory is realized. The provision for bias levels to furthere reduce the size of memory by making the stored correction factors smaller in value further reduces memory size. Other ways to take advantage of the positive quantization technique illustrated in FIG. 3 exist. For example, instead of using predetermined biasing levels, a savings in memory can be realized if the addition correction factors and the differential between the subtraction and addition factors is encoded. When an addition factor is required, the addition factor could be addressed from memory as previously mentioned. When a subtraction factor is required, a predetermined delta value and a corresponding addition factor could be added to provide the correct correction factor. Although a savings in memory has been realized, this method has several disadvantages. Firstly, full value addition factor values must be used so that the addition correction factor table size has not been significantly reduced. Secondly, and more importantly, the addition which is required to provide the total subtraction correction factor must be implemented in a critical time path so that overall calculation speed is sacrificed. Therefore, the use of bias levels to minimize the size of both addition and subtraction correction factors provides the best speed performance and most reduction in memory.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. A method for storing partial operand values in a memory table which are used to form predetermined operands defining a nonlinear monotonic arithmetic function, said memory table providing predetermined portions of the operands, comprising the steps of:
   grouping predetermined operands into a predetermined number, n, of ranges of operand values, where n is an integer;
   storing one or more addressable bias values, each of said bias values representing a predetermined value within one of said n ranges;
   storing a plurality of adjustment values in the memory table, each of said adjustment values representing a partial operand value which when combined with a predetermined bias value provides a predetermined operand; and
   selectively combining a predetermined one of said bias values with a predetermined one of said adjustment values to provide a predetermined one of the operands.

2. The method of claim 1 wherein n predetermined bias values are stored, and each of said n predetermined bias values represents a minimum value within a predetermined one of the n ranges.

3. A method for providing negative and positive correction factors in a memory table which is utilized in logarithmic addition and subtraction, respectively, of logarithmic operands, said addition and subtraction being effected by adding a predetermined correction factor to a minimum logarithmic value of two input operands, comprising the steps of:
   providing a family of negative valued correction factors for addition operations and a family of positive valued correction factors for subtraction operations by correlating each value of a predetermined range of possible magnitude differences of the operands to a predetermined correction factor value; and
   quantizing the family of correction factors for addition and subtraction operations to single polarity values, thereby eliminating storage of sign values of the family of negative valued correction factors.

4. The method of claim 3 further comprising:
   selecting predetermined sub-ranges of operand magnitude difference values, wherein a first portion of each correction value encompassed by a predetermined one of the sub-ranges is represented by a minimum bias value assigned to each sub-range; and
   storing predetermined adjustment values in the memory, each of which when added to a predetermined one of the bias values and a minimum value of the input operands provides an output logarithmic sum or difference.

5. The method of claim 4 further comprising:
   selecting two minimum bias values for each predetermined sub-range of magnitude difference values, a first of the two bias values forming a portion of a correction factor to provide an output sum, and a second of the bias values forming a portion of a correction factor to provide an ouput difference.

6. A circuit for providing a logarithmic sum or difference of two logarithmic input operands, comprising:
   logic means for receiving the input operands and providing a first output which is the absolute value of the difference of said input operands, a second output which is the minimum logarithmic value of the input operands, and an operation control signal in response to the operands' sign values;

bias level means coupled to the logic means for providing a predetermined bias level in response to the first output of the logic means;

first adder means coupled to the bias level means for selectively receiving the second output of the logic means and adding or subtracting the second output of the logic means to the bias level to provide a first intermediate operand;

addressable storage means coupled to the logic means for selectively providing a predetermined second intermediate operand in response to both the output of the logic means and the operation control signal; and second adder means coupled to both the first adder means and the addressable storage means, for combining the first and second intermediate operands to provide said logarithmic sum or difference in response to the operation control signal.

7. The circuit of claim 6 wherein said logic means further comprise switched multiplexing means for providing the minimum logarithmic value of the two input operands as the second output of the logic means in response to a switch control signal.

8. The circuit of claim 6 wherein said bias level means provide a plurality of predetermined bias levels.

9. The circuit of claim 6 further comprising:
switched multiplexing means having first and second inputs coupled to the addressable storage means for receiving first and second correction factors and coupling a predetermined one of the correction factors to said second adder means as the second intermediate operand in response to the operation control signal.

10. The circuit of claim 9 wherein said addressable storage means further comprise:
addition storage means for receiving the output of the logic means and providing the first correction factor to the switched multiplexing means in response thereto; and
subtraction storage means for receiving the output of the logic means and providing the second correction factor to the switched multiplexing means in response thereto.

* * * * *